US012634584B2

(12) United States Patent
Kawabata

(10) Patent No.: US 12,634,584 B2
(45) Date of Patent: May 19, 2026

(54) INFORMATION PROCESSING APPARATUS, METHOD, AND STORAGE MEDIUM

(71) Applicant: CANON KABUSHIKI KAISHA, Tokyo (JP)

(72) Inventor: Kohsuke Kawabata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/787,855

(22) Filed: Jul. 29, 2024

(65) Prior Publication Data

US 2025/0047982 A1     Feb. 6, 2025

(30) Foreign Application Priority Data

Aug. 1, 2023     (JP) ................................. 2023-125511

(51) Int. Cl.
H04N 23/695        (2023.01)
H04N 23/62         (2023.01)
H04N 23/90         (2023.01)

(52) U.S. Cl.
CPC ........... H04N 23/695 (2023.01); H04N 23/62 (2023.01); H04N 23/90 (2023.01)

(58) Field of Classification Search
None
See application file for complete search history.

(56) References Cited

U.S. PATENT DOCUMENTS

| | | | | | |
|---|---|---|---|---|---|
| 10,530,998 | B2 * | 1/2020 | Oshima | .................. | H04N 1/387 |
| 11,113,997 | B2 * | 9/2021 | Kim | ....................... | G09G 3/003 |
| 12,008,904 | B2 * | 6/2024 | Yasui | ........................ | G08G 1/16 |
| 12,015,876 | B2 * | 6/2024 | Nakamura | ............. | G06V 40/10 |
| 2014/0104376 | A1 * | 4/2014 | Chen | ................ | G08B 13/19689 |
| | | | | | 348/36 |
| 2016/0171660 | A1 * | 6/2016 | Sun | ........................ | G06F 1/1639 |
| | | | | | 345/656 |
| 2018/0232945 | A1 * | 8/2018 | Kashibuchi | .......... | H04N 13/239 |
| 2021/0039554 | A1 * | 2/2021 | Suda | ....................... | H04N 23/54 |
| 2022/0321855 | A1 * | 10/2022 | Aizawa | .................. | H04N 23/90 |
| 2023/0122149 | A1 * | 4/2023 | Mccombe | ........... | H04N 13/117 |
| | | | | | 382/103 |
| 2025/0047982 | A1 * | 2/2025 | Kawabata | ............ | H04N 23/698 |

FOREIGN PATENT DOCUMENTS

JP          2019140566 A      8/2019

* cited by examiner

*Primary Examiner* — Daniel T Tekle
(74) *Attorney, Agent, or Firm* — Canon U.S.A., Inc., IP Division

(57)                ABSTRACT

An information processing apparatus includes at least one processing circuit, and at least one memory that stores a computer-readable instruction for causing, when executed by the at least one processing circuit, the information processing apparatus to obtain a first image from a first image capturing unit configured to capture an image with a predetermined angle of view, obtain a second image from a second image capturing unit configured to capture an image of an area overlapping an area whose image is captured by the first image capturing unit with an angle of view narrower than the predetermined angle of view, and wherein, in a case where the first image is rotated by a predetermined angle on a display unit, a display position of the second image on a screen of the display unit is changed based on the predetermined angle.

14 Claims, 12 Drawing Sheets

INFORMATION PROCESSING APPARATUS, METHOD, AND STORAGE MEDIUM

BACKGROUND

Field

The present disclosure relates to an information processing apparatus.

Description of the Related Art

An image capturing apparatus having a configuration in which a plurality of cameras is incorporated in a single casing is known. For example, Japanese Patent Application Laid-Open No. 2019-140566 discusses an image capturing apparatus including a pan-tilt-zoom (PTZ) camera and a predetermined number of wide-area cameras disposed around the PTZ camera. Such an image capturing apparatus is configured to capture an image of surroundings with the predetermined number of wide-area cameras to thereby gaze at and capture an image of an object of interest with the PTZ camera disposed at the center.

In the case of Japanese Patent Application Laid-Open No. 2019-140566, if pan and tilt angles of the PTZ camera are changed, display of images captured by the wide-area cameras is changed based on an image capturing direction of the PTZ camera, so that a user can easily recognize a relationship between an image capturing position of each wide-area camera and an image capturing position of the PTZ camera.

However, in the case of Japanese Patent Application Laid-Open No. 2019-140566, if the display (image) of each wide-area camera is rotated, it may become difficult for the user to recognize the positional relationship between the wide-area cameras and the PTZ camera.

SUMMARY

Accordingly, the present disclosure is directed to providing an information processing apparatus configured to, in a case where an image captured by a wide-angle image capturing unit and an image captured by the image capturing unit with an angle of view narrower than that of the wide-angle image capturing unit are displayed on a single display unit, allow a user to easily recognize a positional relationship between the image captured by the wide-angle image capturing unit and the image captured by the image capturing unit other than the wide-angle image capturing unit even when display of the image captured by the wide-angle image capturing unit is rotated.

According to an aspect of the present invention, an information processing apparatus includes at least one processing circuit, and at least one memory that stores a computer-readable instruction for causing, when executed by the at least one processing circuit, the information processing apparatus to obtain a first image from a first image capturing unit configured to capture an image with a predetermined angle of view, obtain a second image from a second image capturing unit configured to capture an image of an area overlapping an area whose image is captured by the first image capturing unit with an angle of view narrower than the predetermined angle of view, and perform control to display the first image and the second image on a display unit, wherein, in a case where the first image is rotated by a predetermined angle on the display unit, a display position of the second image on a screen of the display unit is changed based on the predetermined angle.

Further features of the present disclosure will become apparent from the following description of exemplary embodiments with reference to the attached drawings.

DESCRIPTION OF THE EMBODIMENTS

Figure 1:
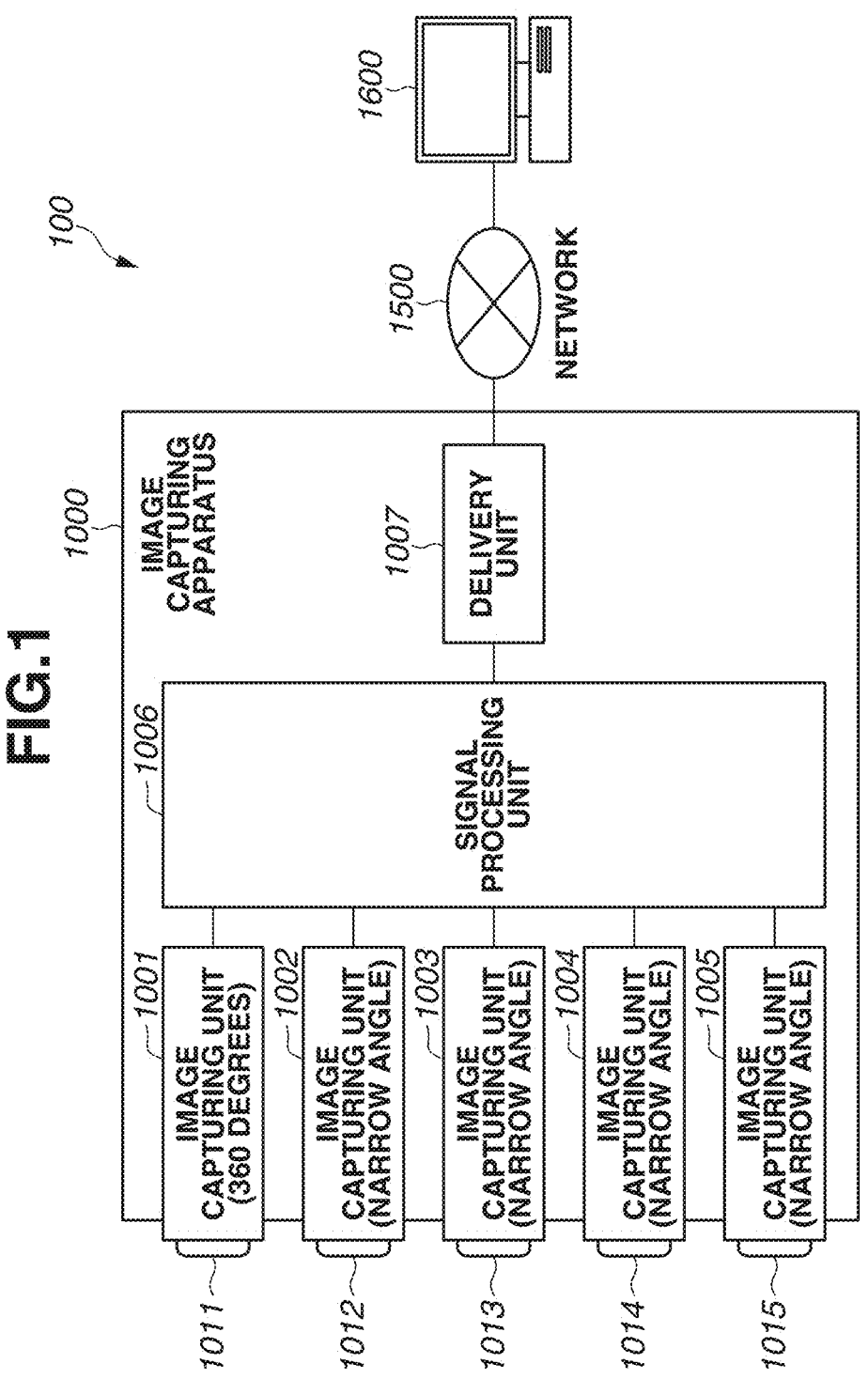
FIG. 1 is a block diagram illustrating a system including a terminal apparatus according to a first exemplary embodiment of the present disclosure.

Exemplary embodiments of the present disclosure will be described in detail below with reference to the accompanying drawings. The following exemplary embodiments are not intended to limit the present disclosure, and not all combinations of features described in the exemplary embodiments are essential to the solution of the present disclosure. The configurations of the exemplary embodiments can be appropriately modified or changed depending on the specifications of the apparatus to which the present disclosure is applied and various conditions (usage conditions, usage environment, etc.). The technical scope of the present disclosure is defined by the claims and is not limited by the following individual exemplary embodiments. Parts of the exemplary embodiments may be combined as appropriate. Throughout the drawings, components having the same function are denoted by the same reference numeral, and repeated descriptions thereof are omitted.

FIG. 1 illustrates a monitoring system 100 according to a first exemplary embodiment of the present disclosure. The monitoring system 100 includes an image capturing apparatus 1000 and a terminal apparatus 1600 connected to the image capturing apparatus 1000 via a network 1500. The terminal apparatus 1600 is operated by, for example, a user of the monitoring system 100. The terminal apparatus 1600 is, for example, a personal computer.

The image capturing apparatus 1000 includes an image capturing unit 1001, an image capturing unit 1002, an image capturing unit 1003, an image capturing unit 1004, an image capturing unit 1005, a signal processing unit 1006, and a delivery unit 1007. The image capturing units 1001 to 1005 are each connected to the signal processing unit 1006. The signal processing unit 1006 is connected to the delivery unit 1007.

The image capturing unit 1001 includes a lens 1011 and an image sensor, such as a charge-coupled device (CCD) sensor or a complementary metal-oxide semiconductor (CMOS) sensor, which is not illustrated in FIG. 1. The image sensor converts light incident from the lens 1011 into an electric signal. The image capturing unit 1001 is a wide-angle camera. In the first exemplary embodiment, assume that the lens 1011 of the image capturing unit 1001 is a super-wide-angle lens, such as a fish-eye lens, and a horizontal angle of view of the lens 1011 is about 180 degrees. In the first exemplary embodiment, the image capturing unit 1001 is a 360-degree camera (configured to capture a 360-degree image). The image capturing units 1002 to 1005 are gaze cameras each configured to capture an image of an object (object of interest) in a 360-degree image captured by the image capturing unit 1001. In other words, the image capturing units 1002 to 1005 each capture an image of an area overlapping an area whose image is captured by the image capturing unit 1001. In the first exemplary embodiment, assume that images of areas captured by the four image capturing units 1002 to 1005 do not overlap with each other.

The image capturing units 1002 to 1005 each have a structure similar to that of the image capturing unit 1001. Specifically, the image capturing unit 1002 includes a lens 1012 and an image sensor (not illustrated), the image capturing unit 1003 includes a lens 1013 and an image sensor (not illustrated), the image capturing unit 1004 includes a lens 1014 and an image sensor (not illustrated), and the image capturing unit 1005 includes a lens 1015 and an image sensor (not illustrated). Assume that all the lenses 1012 to 1015 have the same angle of view, and the horizontal angle of view of each of the lenses 1012 to 1015 is narrower than that of the lens 1011. In other words, the image capturing units 1002 to 1005 are cameras having the angle of view narrower than the angle of view of the image capturing unit 1001 that is a wide-angle camera. In the first exemplary embodiment, the angle of view of each of the image capturing units 1002 to 1005 is all the same.

The signal processing unit 1006 is configured to perform predetermined image processing and compression coding processing on electric signals output from the image capturing units 1001 to 1005, thereby generating image data.

The signal processing unit 1006 is also configured to transmit setting values for image capturing conditions to the image capturing units 1001 to 1005 and to change an operating state of each of the image capturing units 1001 to 1005. The image capturing conditions include a gain condition, a gamma condition, a dynamic range condition, an exposure condition, and a focusing condition.

The delivery unit 1007 is connected to the network 1500. The delivery unit 1007 converts the image data output from the signal processing unit 1006 into a signal in an appropriate format, and transmits the signal to the network 1500.

The network 1500 transmits information (including images) received from the image capturing apparatus 1000 to the terminal apparatus 1600. The terminal apparatus 1600 receives captured images that are captured by the image capturing units 1001 to 1005 of the image capturing apparatus 1000, thereby obtaining the images captured by the image capturing units 1001 to 1005.

The network 1500 also transmits information received from the terminal apparatus 1600 to the image capturing apparatus 1000. When the information (e.g., information input by the user) received from the terminal apparatus 1600 is input to the image capturing apparatus 1000 via the network 1500, the delivery unit 1007 receives the information, converts the information into an appropriate format, and transmits the converted information (signal) to the signal processing unit 1006.

The network 1500 may be a network over which data can be exchanged among any plurality of devices. In the first exemplary embodiment, assume that the network 1500 is a wired local area network (LAN) compliant with Ethernet®.

Parts of functional modules (1006, 1007) included in the image capturing apparatus 1000 illustrated in FIG. 1 may be implemented by hardware. In a case where the parts of the functional modules are implemented by hardware, for example, a predetermined compiler may be used to automatically generate a dedicated circuit on a field-programmable gate array (FPGA) from a program for implementing each function of each of the functional modules. A gate array circuit may be formed in the same way as the FPGA, and the gate array circuit may be implemented as hardware. Alternatively, each function may be implemented by an application-specific integrated circuit (ASIC). The configuration of each of the functional modules illustrated in FIG. 1 is merely an example. A plurality of functional modules may constitute a single functional module, or one of the functional modules may be divided into modules each configured to implement a plurality of functions.

Figure 2A:
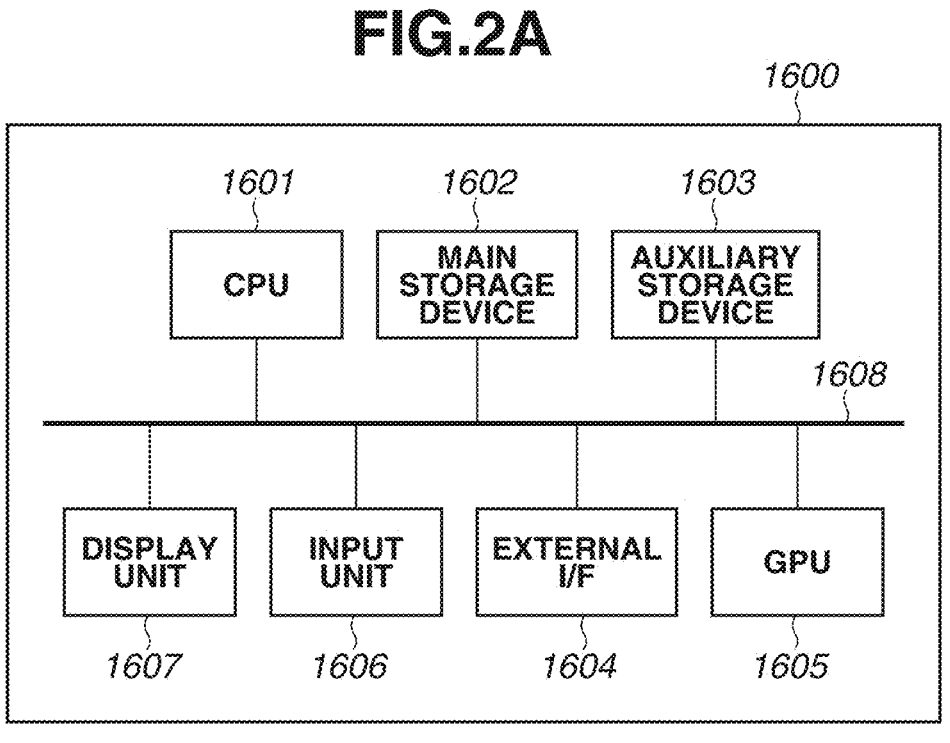
FIGS. 2A and 2B are block diagrams each illustrating a configuration of the terminal apparatus illustrated in FIG. 1.

FIG. 2A is a block diagram illustrating a hardware configuration of the terminal apparatus 1600. The terminal apparatus 1600 includes a central processing unit (CPU) 1601, a main storage device 1602, an auxiliary storage device 1603, an external interface (I/F) 1604, a graphics processing unit (GPU) 1605, an input unit 1606, and a display unit 1607. The units (1601 to 1607) of the terminal apparatus 1600 are interconnected via a bus 1608 so that the units can communicate with each other. The terminal apparatus 1600 that processes various types of information may also be referred to as an information processing apparatus. The CPU 1601 is a central processing unit that controls overall operation of the terminal apparatus 1600, and performs various kinds of arithmetic processing, image processing, and data input-output processing.

The main storage device 1602 is a storage device that functions as a work area or a temporary storage area of data for the CPU 1601. The main storage device 1602 is implemented using a storage medium such as a dynamic random access memory (DRAM) or a static random access memory (SRAM).

The auxiliary storage device 1603 is a storage device that stores various programs, various kinds of setting information, various kinds of image data, camera parameters, three-dimensional shape data, and information about a two-dimensional map and the like. The auxiliary storage device 1603 is implemented using a nonvolatile memory such as a read-only memory (ROM) or a flash memory, or a storage medium such as a hard disk drive (HDD), a solid state drive (SSD), or a tape medium. To increase the capacity and processing speed, a plurality of nonvolatile memories, HDDs, and SSDs may be combined into a single logical unit, such as a redundant array of independent disk (RAID).

The external I/F 1604 is a general-purpose input-output interface. The external I/F 1604 includes a communication interface used for communication with the image capturing apparatus 1000. The external I/F 1604 may be connected to an external device that receives various operations from the user. The external I/F 1604 may be connected to an external storage from which a file may be input to or to which a file may be output from the terminal apparatus 1600.

The external I/F 1604 is configured to be, for example, an interface including a connection terminal for a physical cable, such as InfiniBand, Ethernet®, or a universal serial bus (USB), or an interface using a wireless connection, such as a wireless LAN or Bluetooth®. Signals input from the network 1500 are transmitted to the CPU 1601 via the interface for Ethernet® or the like included in the external I/F 1604.

The GPU 1605 is an arithmetic unit that executes an image processing operation at a high speed. The GPU 1605 converts an image (video image) received from the image capturing apparatus 1000 into an appropriate format, and outputs the image. The GPU 1605 may include a main storage device separately from the main storage device 1602. The GPU 1605 may perform a part or all of various arithmetic operations performed by the CPU 1601 other than the operations described above.

The input unit 1606 includes a keyboard, a mouse, and a joystick. The user can operate the input unit 1606 to input a desired instruction, data, and the like to the terminal apparatus 1600. A user instruction and the like input from the input unit 1606 are converted into appropriate signals, and the signals are transmitted to the image capturing apparatus 1000. The input unit 1606 that is operated by the user may also be referred to as an operation unit. The input unit 1606 need not necessarily be disposed in the terminal apparatus 1600. In this case, the input unit 1606, such as a keyboard, a mouse, or a joystick, is connected to the terminal apparatus 1600 via the external I/F 1604.

The display unit 1607 includes a liquid crystal monitor. The display unit 1607 is configured to display images transmitted from the image capturing apparatus 1000 to the terminal apparatus 1600 so that the user can view the images. The display unit 1607 is also configured to display information input from the input unit 1606 by the user. The display unit 1607 that displays (outputs) images may also be referred to as an output unit. The display unit 1607 may also function as a touch panel. In this case, it can be said that the display unit 1607 also functions as a part of the input unit 1606. In the case where the display unit 1607 also functions as a touch panel, the display unit 1607 is a graphical user interface (GUI).

The bus 1608 is a bus based on Peripheral Component Interconnect Express (PCI Express) or the like, and enables the units (1601 to 1607) represented by hardware blocks to establish a bidirectional communication. Any type of bus may be used as the bus 1608 as long as the units represented by the hardware blocks can establish a bidirectional communication via the bus.

Figure 2B:
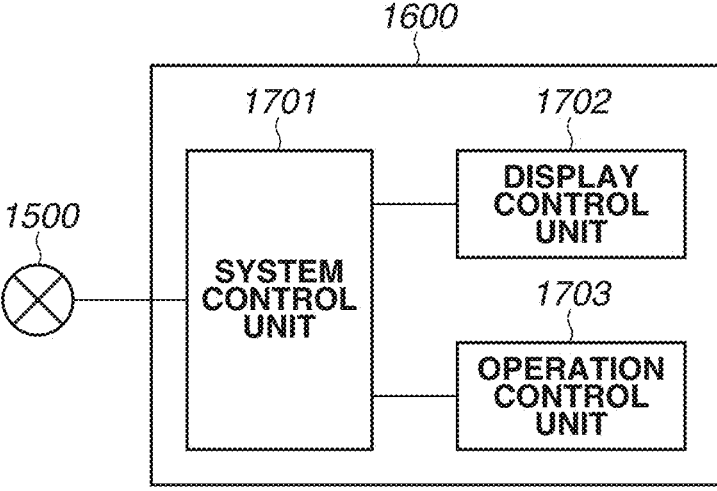

FIG. 2B is a block diagram illustrating a functional configuration of the terminal apparatus 1600. The terminal apparatus 1600 includes a system control unit 1701, a display control unit 1702, and an operation control unit 1703.

The system control unit 1701 performs processing of, for example, establishing communication with an external apparatus, such as the image capturing apparatus 1000, controlling each function of the terminal apparatus 1600, and setting various parameters. More specifically, the system control unit 1701 executes processing of, for example, receiving images transmitted from the image capturing apparatus 1000, issuing an instruction to display the received images, and receiving an input based on an operation via the input unit 1606. The display control unit 1702 causes a monitor (screen 3000 illustrated in FIG. 5) of the display unit 1607 to display information based on an instruction in response to the instruction from the system control unit 1701. The display control unit 1702 further causes the monitor of the display unit 1607 to display images transmitted from the image capturing units 1001 to 1005 of the image capturing apparatus 1000. This enables the user to check the images captured by the image capturing apparatus 1000 by viewing the monitor of the display unit 1607. The operation control unit 1703 receives an instruction from the user based on a user operation via the input unit 1606 and transmits information about the received instruction to the system control unit 1701. For example, the operation control unit 1703 receives an instruction to drive the wide-angle camera (image capturing unit) 1001 from the user based on a user operation via the input unit 1606, and transmits information about the received instruction to the system control unit 1701. Upon receiving the instruction to drive the wide-angle camera 1001, the system control unit 1701 transmits the received instruction to the image capturing apparatus 1000, thereby instructing the image capturing apparatus 1000 to drive the wide-angle camera 1001.

Figure 3A:
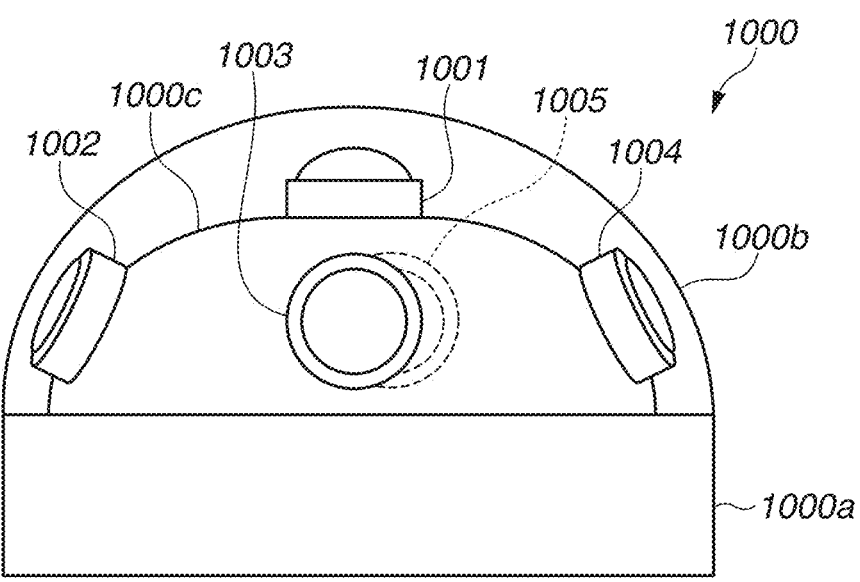
FIGS. 3A and 3B are external schematic views of an image capturing apparatus illustrated in FIG. 1.
Figure 3B:
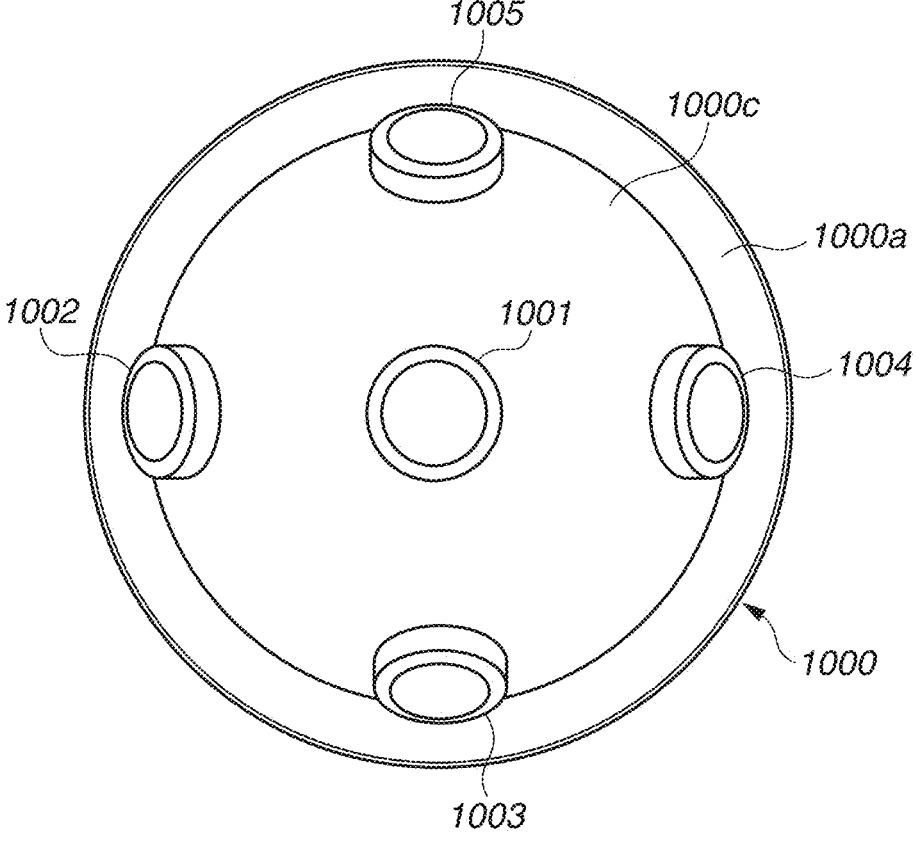

FIGS. 3A and 3B are schematic views each illustrating a layout of the image capturing units 1001 to 1005 in the image capturing apparatus 1000.

FIG. 3A is a side view of the image capturing apparatus 1000, and FIG. 3B is a top view of the image capturing apparatus 1000. The image capturing apparatus 1000 includes a base portion 1000a, a cover portion 1000b, and a support portion 1000c. The support portion 1000c is disposed on the base portion 1000a. The cover portion 1000b is disposed on the base portion 1000a so as to cover the support portion 1000c.

The image capturing unit 1001 is disposed at a top portion of the support portion 1000c. The image capturing units 1002 to 1005 are disposed on a peripheral surface of the support portion 1000c. The image capturing units 1001 to 1005 are accommodated in a space defined by the base portion 1000a and the cover portion 1000b. As illustrated in FIG. 3B, as viewed from the top of the image capturing apparatus 1000, the image capturing units 1002 to 1005 are arranged on a circumference of a circle with the image capturing unit 1001 as the center, and the image capturing units 1002 to 1005 are arranged at intervals of 90 degrees. In other words, the plurality of image capturing units 1002 to 1005, each of which is configured to capture an image of an area overlapping an area whose image is captured by the image capturing unit 1001 with an angle of view narrower than that of the image capturing unit 1001, is arranged around the image capturing unit 1001. An optical axis direction of each of the image capturing units 1001 to 1005 is fixed.

The configuration of the image capturing apparatus 1000 is not limited to the configuration illustrated in FIGS. 2 and 3. The configuration illustrated in FIGS. 2 and 3 is merely an example. The configuration of the image capturing apparatus 1000 may be appropriately changed and configured depending on an image capturing target and functions.

How to display an image captured by the image capturing unit (wide-angle camera) 1001 and images captured by the four image capturing units (multiple cameras) 1002 to 1005 arranged around the image captured by the image capturing unit 1001 on a single screen 3000 of the display unit 1607 in the monitoring system 100 according to the first exemplary embodiment will be described below.

Figure 4:
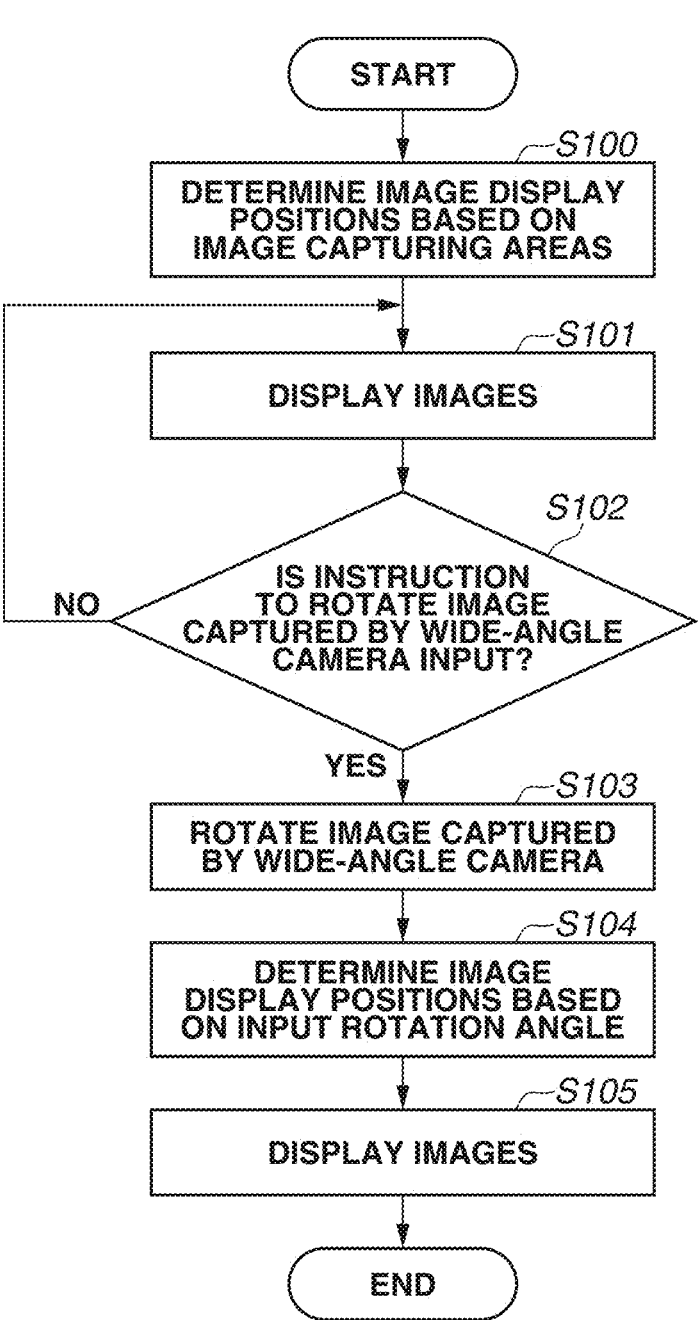
FIG. 4 is a flowchart illustrating a processing procedure according to the first exemplary embodiment.

FIG. 4 is a flowchart illustrating operations and processing to be performed by the terminal apparatus 1600. The flowchart illustrates a processing procedure to be executed by the CPU 1601 of the terminal apparatus 1600 by controlling the control units 1701 to 1703. The processing flow is implemented by the CPU 1601 loading programs stored in the auxiliary storage device 1603 and executing the programs.

Assume that the terminal apparatus 1600 receives images captured by the image capturing units 1001 to 1005 from the image capturing apparatus 1000, thereby obtaining the captured images. Also, assume that the display unit 1607 of the terminal apparatus 1600 functions as a GUI.

When the processing flow starts, in step S100, the CPU 1601 determines display positions of the images captured by the image capturing units 1001 to 1005 on the screen (display area) 3000 of the display unit (GUI) 1607. The display positions of the images are determined based on image capturing areas of the image capturing units 1001 to 1005.

Figure 5:
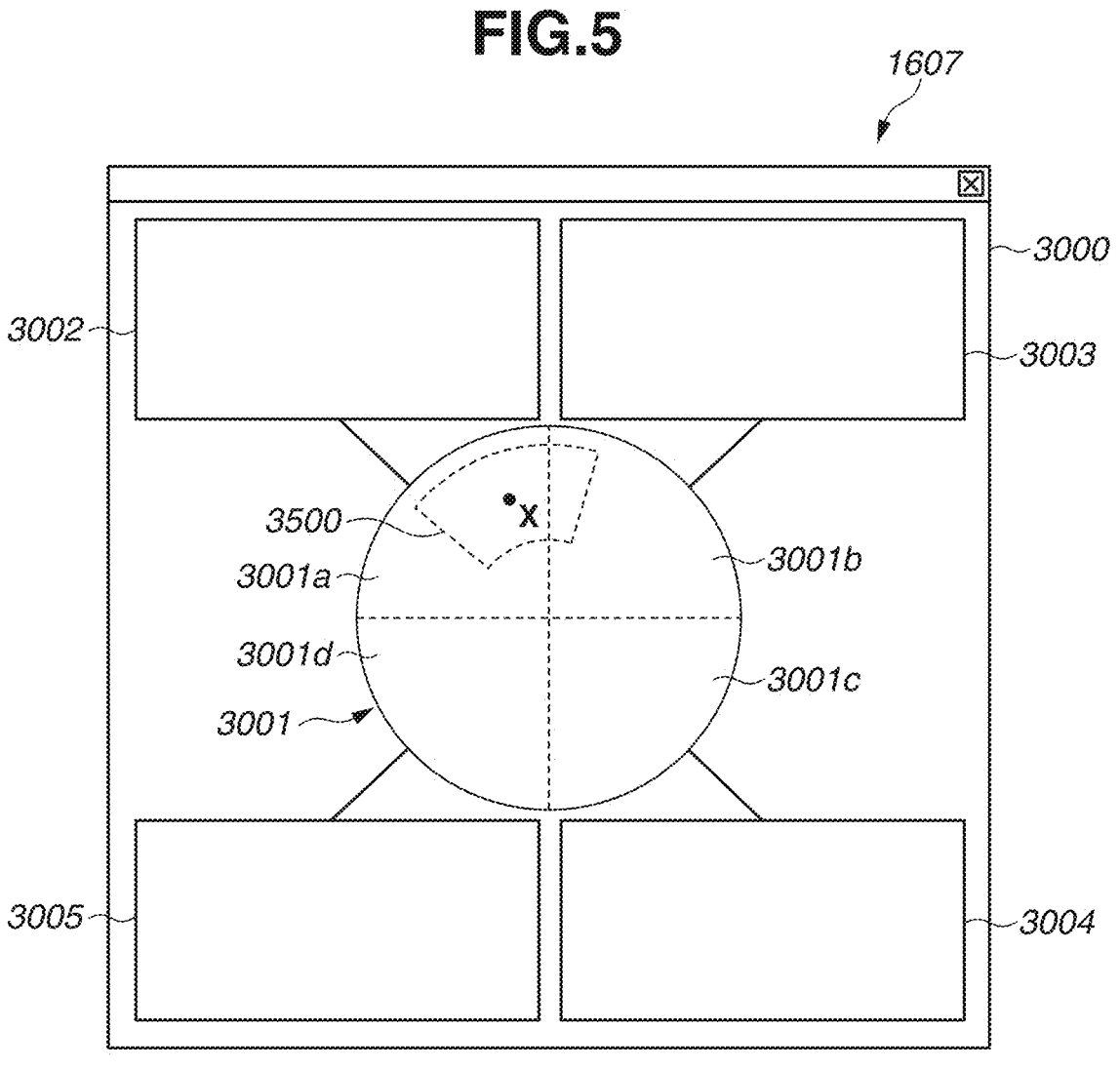
FIG. 5 illustrates a screen of a graphical user interface (GUI) of the terminal apparatus illustrated in FIG. 1.

FIG. 5 illustrates the screen 3000 of the display unit (GUI) 1607 of the terminal apparatus 1600. Five areas 3001, 3002, 3003, 3004, and 3005 are set on the screen 3000. The area 3001 is a circular area, and the areas 3002 to 3005 are rectangular areas. The area 3001 is located at the center of the screen 3000, and the areas 3002 to 3005 are located around the area 3001. Specifically, the area 3002 is located at an upper left position of the screen 3000, the area 3003 is located at an upper right position of the screen 3000, the area 3004 is located at a lower right position of the screen 3000, and the area 3005 is located at a lower left position of the screen 3000. The image captured by the image capturing unit 1001 is displayed in the area 3001. The image captured by one of the image capturing units 1002 to 1005 is displayed in one of the areas 3002 to 3005.

To display the images captured by the image capturing units 1002 to 1005 individually on the screen 3000 of the display unit 1607, the same number of areas 3002 to 3005 as the number of (four in the first exemplary embodiment) image capturing units 1002 to 1005 is set.

Next, determination of display positions will be described. The area 3001 is divided into an area 3001a, an area 3001b, an area 3001c, and an area 3001d in advance. Each of the areas 3001a to 3001d is an area of a quarter circle obtained by dividing the area 3001 into four areas. The CPU 1601 calculates a central position of each of the image capturing areas of the image capturing units 1002 to 1005 in the image captured by the image capturing unit 1001, and determines in which one of the areas 3001a, 3001b, 3001c, and 3001d the central position is located. If the central position of the image capturing area is present in the area 3001a, the image captured by the image capturing unit is displayed in the area 3002. If the central position of the image capturing area is present in the area 3001b, the image captured by the image capturing unit is displayed in the area 3003. If the central position of the image capturing area is present in the area 3001c, the image captured by the image capturing unit is displayed in the area 3004. If the central position of the image capturing area is present in the area 3001d, the image captured by the image capturing unit is displayed in the area 3005. For example, in a case where the image capturing area of one of the image capturing units 1002 to 1005 is set as an area 3500 and the center of the area 3500 is set as a point X, the image captured by the image capturing unit is displayed in the area 3002. In the first exemplary embodiment, the center of each image capturing area is represented by coordinates where the optical axis of the image capturing unit is projected onto the image capturing area. However, the center of each image capturing area is not limited to this point. Any point (e.g., the center of mass of a person (object) in an image) that is appropriately set in the image capturing area may be the center of the image capturing area.

Figure 6:
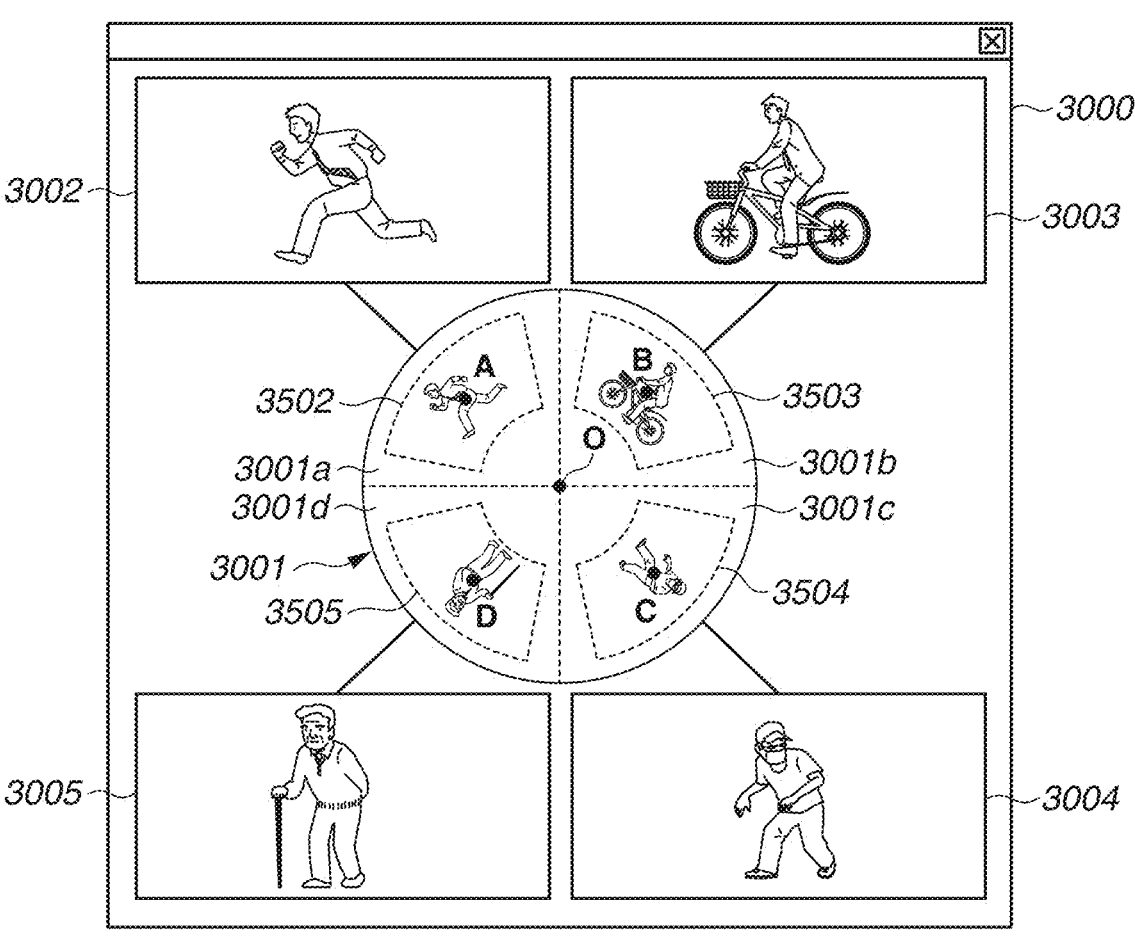
FIG. 6 illustrates a display example of the screen of the GUI illustrated in FIG. 5.

FIG. 6 illustrates the display positions determined in step S100. Assume that each of the image capturing units 1002 to 1005 captures an image of a person as an object. In the example illustrated in FIG. 6, the center of an image capturing area 3502 of the image capturing unit 1002 is set as a point A, the center of an image capturing area 3503 of the image capturing unit 1003 is set as a point B, the center of an image capturing area 3504 of the image capturing unit 1004 is set as a point C, and the center of an image capturing area 3505 of the image capturing unit 1005 is set as a point D. The point A is located in the area 3001a, and thus the CPU 1601 determines that the image captured by the image capturing unit 1002 is displayed in the area 3002. The point B is located in the area 3001b, and thus the CPU 1601 determines that the image captured by the image capturing unit 1003 is displayed in the area 3003. The point C is located in the area 3001c, and thus the CPU 1601 determines that the image captured by the image capturing unit 1004 is displayed in the area 3004. The point D is located in the area 3001d, and thus the CPU 1601 determines that the image captured by the image capturing unit 1005 is displayed in the area 3005.

In step S101, the CPU 1601 displays the images captured by the image capturing units 1002 to 1005 on the screen 3000 of the display unit (GUI) 1607 based on the display positions determined in step S100. Specifically, the image captured by the image capturing unit 1002 is displayed in the area 3002, the image captured by the image capturing unit 1003 is displayed in the area 3003, the image captured by the image capturing unit 1004 is displayed in the area 3004, and the image captured by the image capturing unit 1005 is displayed in the area 3005. Further, the image captured by the image capturing unit 1001 is displayed in the area 3001, and the image capturing areas 3502 to 3505 of the image capturing units 1002 to 1005, respectively, are displayed on the image. The image capturing unit 1001 captures an image (360-degree image) of an entire area from a bird's-eye view, and complements portions (peripheral portions) where details can be blurred in the image captured in the image capturing unit 1001 with the images captured by the image capturing units 1002 to 1005. In FIG. 6, illustration of details (portions other than the object) of the image captured by the image capturing unit 1001 is omitted.

Next, processing of step S102 will be described. The image captured by the image capturing unit 1001 and displayed on the screen 3000 can be displayed in a rotated manner at any angle about a point O as the center of the displayed image. In the first exemplary embodiment, assume that the user can input an instruction to rotate the image captured by the image capturing unit 1001 clockwise (or counterclockwise) by an angle θ via the input unit 1606. In step S102, the CPU 1601 determines whether an image rotation instruction is input from the user. If the CPU 1601 determines that the image rotation instruction is input from the user (YES in step S102), the processing proceeds to step S103. In step S103, the CPU 1601 analyzes the instruction (input signal), rotates the image captured by the image capturing unit 1001 by the angle θ, and displays the rotated image in the area 3001 of the screen 3000. After the image captured by the image capturing unit 1001 is rotated, the processing proceeds to step S104.

If the image rotation instruction from the user is not detected (NO in step S102), the processing returns to step S101.

In the following description, assume that an instruction to rotate the image captured by the image capturing unit 1001 clockwise by the angle θ is input by the user.

Figure 7A:
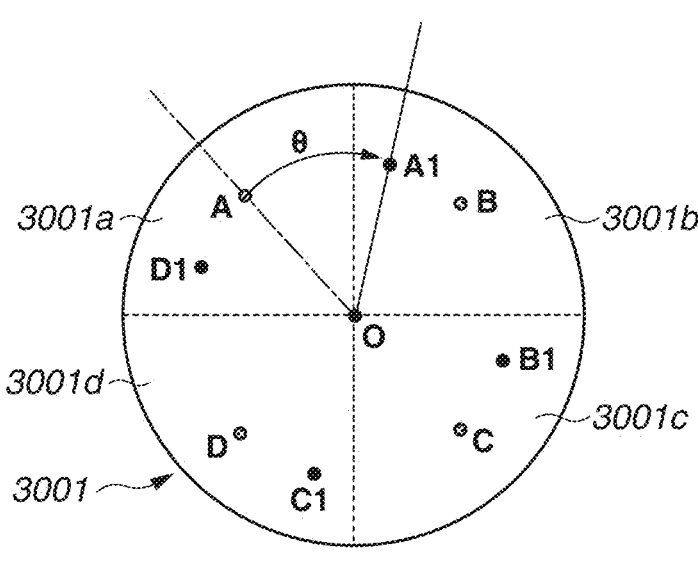
FIGS. 7A and 7B each illustrate the screen of the GUI when images are rotated from a state illustrated in FIG. 6.

In step S104, the CPU 1601 changes (determines) the display positions of the images captured by the image capturing units 1002 to 1005 on the screen 3000 based on the rotation angle θ input by the user. When the image captured by the image capturing unit 1001 is rotated clockwise by the angle θ, as illustrated in FIG. 7A, the point A is also rotated clockwise by the angle θ and moves to a point μl. The point B is also rotated clockwise by the angle θ and moves to a point B1. The point C is also rotated clockwise by the angle θ and moves to a point C1. The point D is also rotated clockwise by the angle θ and moves to a point D1. After the rotation, the point μl is located in the area 3001b, and thus the CPU 1601 determines that the image captured by the image capturing unit 1002 is displayed in the area 3003. The point B1 is located in the area 3001c, and thus the CPU 1601 determines that the image captured by the image capturing unit 1003 is displayed in the area 3004. The point C1 is located in the area 3001d, and thus the CPU 1601 determines that the image captured by the image capturing unit 1004 is displayed in the area 3005. The point D1 is located in the area 3001a, and thus the CPU 1601 determines that the image captured by the image capturing unit 1005 is displayed in the area 3002.

Figure 7B:
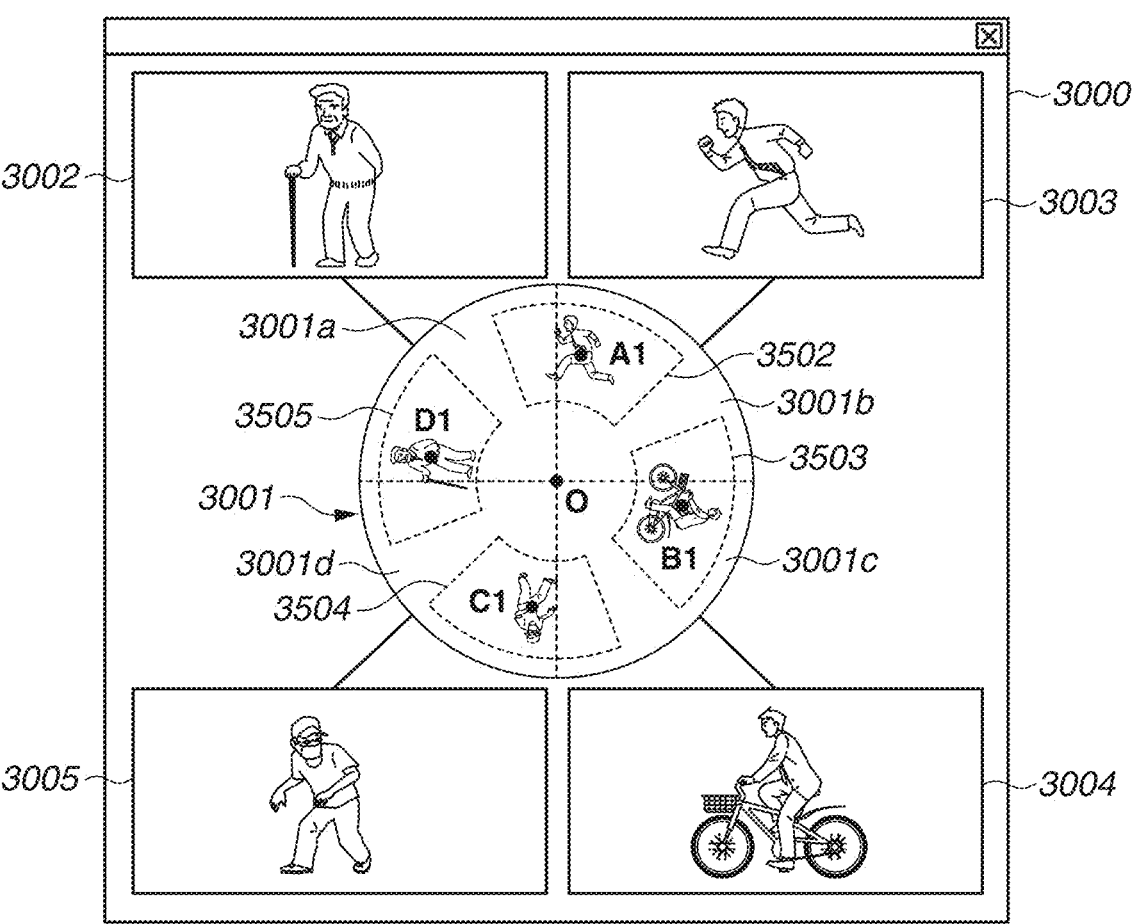

In step S105, as illustrated in FIG. 7B, the CPU 1601 displays the images at the display positions determined in step S104 on the screen 3000. Specifically, the CPU 1601 displays the image captured by the image capturing unit 1002 in the area 3003, displays the image captured by the image capturing unit 1003 in the area 3004, displays the image captured by the image capturing unit 1004 in the area 3005, and displays the image captured by the image capturing unit 1005 in the area 3002. After the processing is performed as described above, the processing flow ends.

With the image capturing apparatus 1000 according to the first exemplary embodiment, the image capturing apparatus 1000 including a combination of the multiple cameras 1002 to 1005 and the wide-angle camera 1001 is configured to display the images captured by the multiple cameras 1002 to 1005 by changing the display positions thereof based on a change in display of the wide-angle camera 1001. If the images captured by the multiple cameras 1002 to 1005 are not changed when the image captured by the wide-angle camera 1001 is rotated, it is difficult to understand a correspondence relationship between the image captured by the wide-angle camera 1001 and the images captured by the multiple cameras 1002 to 1005. In the first exemplary embodiment, the correspondence relationship between the images can be easily understood since the positions of the images captured by the multiple cameras 1002 to 1005 are changed in accordance with the rotation of the image captured by the wide-angle camera 1001.

In the exemplary embodiment described above, four cameras are used as the multiple cameras. However, the number of multiple cameras to be used is not limited to four. While the terminal apparatus 1600 includes the display unit 1607 in the exemplary embodiment described above, the display unit 1607 may be disposed outside of the terminal apparatus 1600 as an independent apparatus. In this case, the display unit (display apparatus) 1607 is connected to the external I/F 1604.

A second exemplary embodiment of the present disclosure will be described below with reference to FIGS. 8 to 12B. An image capturing apparatus according to the second exemplary embodiment includes a single wide-angle camera (360-degree camera) and a plurality of gaze cameras each having an angle of view that can be changed. In the second exemplary embodiment, the user designates an object from an image (video image) captured by the wide-angle camera, the image captured by the wide-angle camera is rotated on the screen of the display unit 1607 based on the designation, and display positions of images captured by the gaze cameras are also changed. Components according to the second exemplary embodiment that are similar to those according to the first exemplary embodiment are denoted by the same reference numerals, and the description thereof may be omitted.

Figure 8:
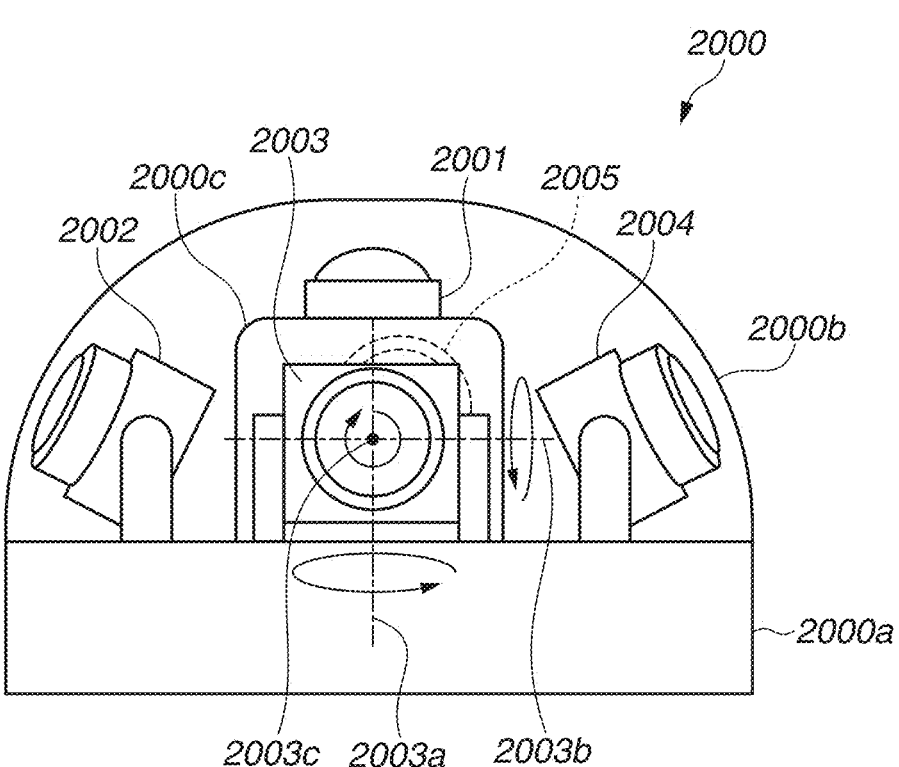
FIG. 8 is an external schematic view of an image capturing apparatus according to a second exemplary embodiment of the present disclosure.

FIG. 8 is a schematic view of an image capturing apparatus 2000 used in the second exemplary embodiment. The image capturing apparatus 2000 includes a base portion 2000a, a cover portion 2000b, and a support portion 2000c disposed on the base portion 2000a. The support portion 2000c is disposed on the base portion 2000a. The cover portion 2000b is disposed on the base portion 2000a so as to cover the support portion 2000c.

The image capturing apparatus 2000 includes image capturing units 2001 to 2005. The image capturing unit 2001 is a 360-degree camera. The image capturing unit 2001 is disposed on a top surface of the support portion 2000c. The image capturing units 2002 to 2005 are gaze cameras. The image capturing units 2002 to 2005 are disposed on a top surface of the base portion 2000a. The image capturing units 2001 to 2005 are accommodated in a space defined by the base portion 2000a and the cover portion 2000b.

The image capturing unit 2001 has the same configuration as that of the image capturing unit 1001 according to the first exemplary embodiment. As in the first exemplary embodiment, the image capturing unit 2001 is located at the center, and the image capturing units 2002 to 2005 are arranged at regular intervals around the image capturing unit 2001. An X-axis, a Y-axis, and a Z-axis are defined for each of the image capturing units 2002 to 2005. The Z-axis corresponds to an optical axis direction of each of the image capturing units 2002 to 2005. The X-axis and the Y-axis are orthogonal to the Z-axis. FIG. 8 illustrates an X-axis 2003a, a Y-axis 2003b, and a Z-axis 2003c of the image capturing unit 2003. Angles of the image capturing units 2002 to 2005 about the X-axis, the Y-axis, and the Z-axis can be changed. The angles thereof about the axes (X-axis, Y-axis, and Z-axis) can be changed independently. In the case of the image capturing unit 2003, a rotation about the X-axis corresponds to a pan operation of the image capturing unit 2003, and a rotation about the Y-axis corresponds to a tilt operation of the image capturing unit 2003. Image capturing directions of the image capturing units 2002 to 2005 can be changed by changing the angles of the image capturing units 2002 to 2005 about the X-axis and the Y-axis. The image capturing units 2002 to 2005 may also be referred to as movable image capturing units. The image capturing unit 2001 may also be referred to as a fixed image capturing unit. An image capturing range of each of the image capturing units 2002 to 2005 can be changed using a zoom function incorporated in a corresponding lens (not illustrated).

Figure 9:
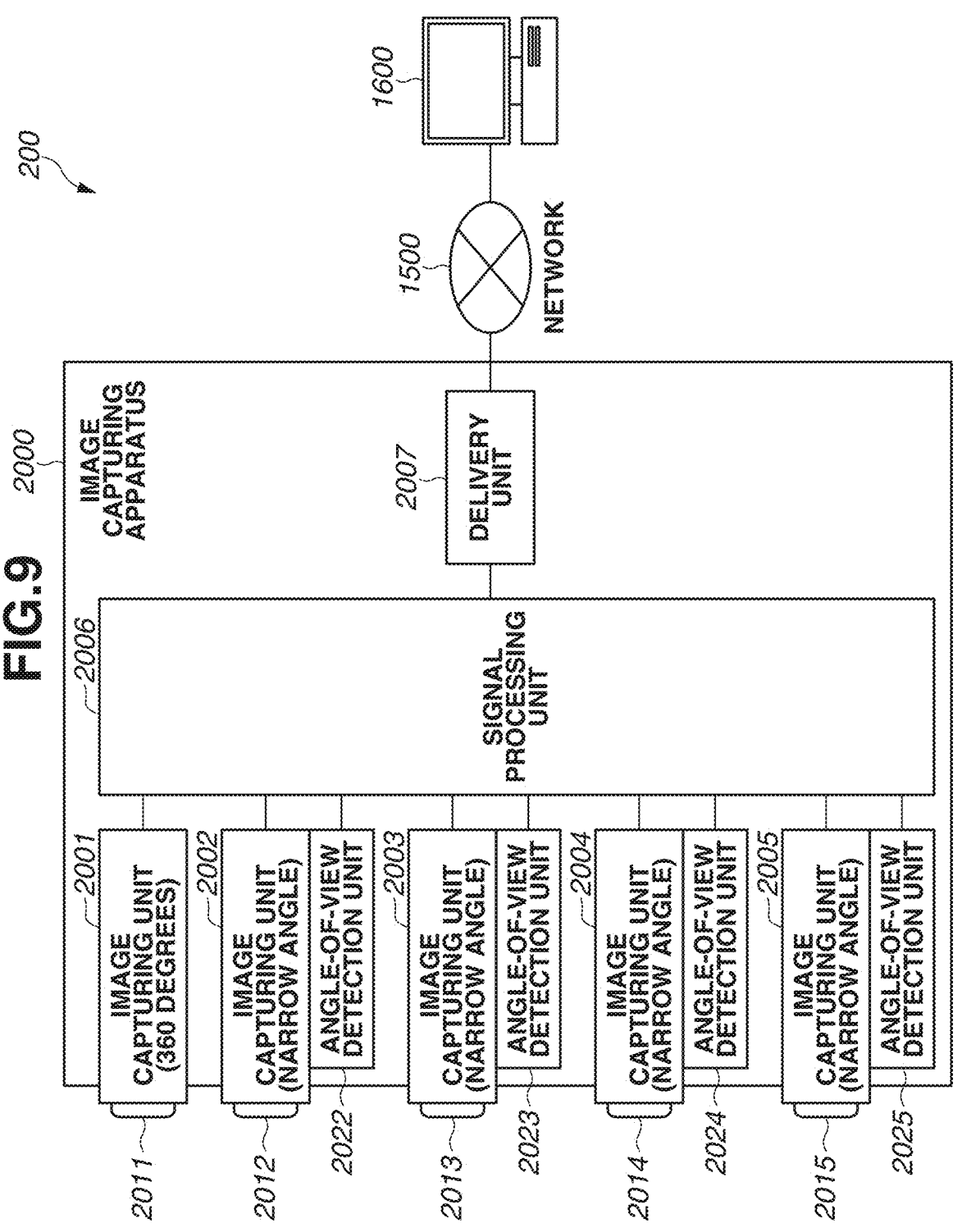
FIG. 9 is a block diagram illustrating a system including a terminal apparatus according to a second exemplary embodiment of the present disclosure.

FIG. 9 illustrates a monitoring system 200 according to the second exemplary embodiment. The monitoring system 200 includes the image capturing apparatus 2000, and the terminal apparatus 1600 connected to the image capturing apparatus 2000 via the network 1500. The image capturing unit 2001 includes a lens 2011. The image capturing unit 2002 includes a lens 2012 and an angle-of-view detection unit 2022. The image capturing unit 2003 includes a lens 2013 and an angle-of-view detection unit 2023. The image capturing unit 2004 includes a lens 2014 and an angle-of-view detection unit 2024.

The image capturing unit 2005 includes a lens 2015 and an angle-of-view detection unit 2025. The angle-of-view detection units 2022 to 2025 detect image capturing angles of the image capturing units 2002 to 2005, respectively. Each of the angle-of-view detection units 2022 to 2025 includes a device configured to detect an angle, such as a rotary encoder. Each of the image capturing units 2002 to 2005 is configured to change the image capturing range using the zoom function incorporated in each of the lenses 2012 to 2015. The terminal apparatus 1600 obtains the image capturing angles of the image capturing units 2002 to 2005 from the angle-of-view detection units 2022 to 2025, respectively.

In the second exemplary embodiment, the angle-of-view detection unit 2022 detects angles of the image capturing unit 2002 relative to the X-axis, the Y-axis, and the Z-axis. Similarly, the angle-of-view detection unit 2023 detects angles of the image capturing unit 2003 relative to the X-axis, the Y-axis, and the Z-axis, the angle-of-view detection unit 2024 detects angles of the image capturing unit 2004 relative to the X-axis, the Y-axis, and the Z-axis, and the angle-of-view detection unit 2025 detects angles of the image capturing unit 2005 relative to the X-axis, the Y-axis, and the Z-axis. Information about the angles (angle information) detected by the angle-of-view detection units 2022 to 2025 is transmitted in an appropriate format to a signal processing unit 2006.

Assume that the signal processing unit 2006 has the same function as that of the signal processing unit 1006 according to the first exemplary embodiment and a delivery unit 2007 has the same function as that of the delivery unit 1007 according to the first exemplary embodiment.

Figure 10:
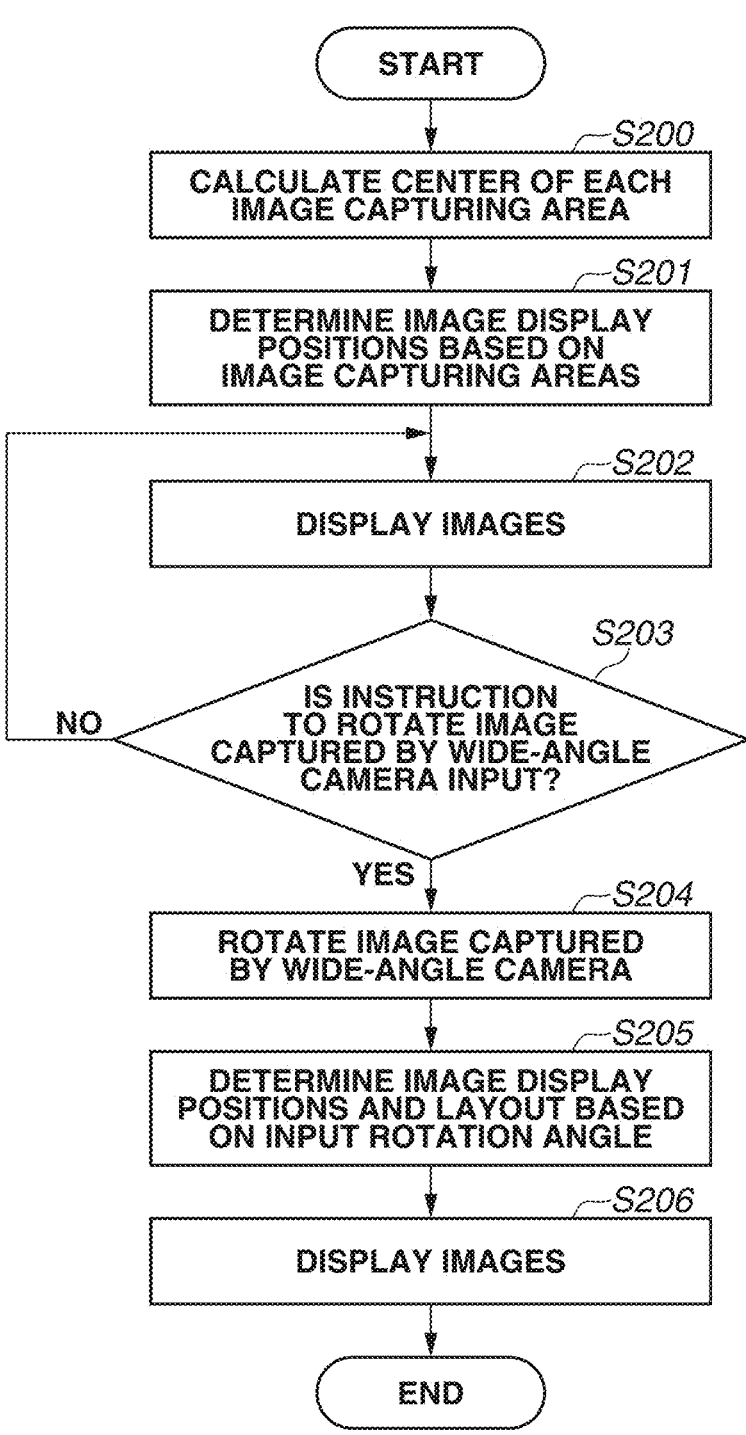
FIG. 10 is a flowchart illustrating a processing procedure according to the second exemplary embodiment.

Next, a processing flow according to the second exemplary embodiment will be described with reference to FIG. 10. As in the first exemplary embodiment, the flowchart illustrates a processing procedure to be executed by the CPU 1601 of the terminal apparatus 1600 by controlling the control units. The processing flow is implemented by the CPU 1601 loading programs stored in the auxiliary storage device 1603 and executing the programs.

When the processing flow starts, in step S200, the CPU 1601 calculates centers of image capturing areas of the image capturing units 2002 to 2005 in the image captured by the image capturing unit 2001 based on the angles of the image capturing units 2002 to 2005 obtained by the angle-of-view detection units 2022 to 2025, respectively. In the second exemplary embodiment, as a result of the calculation, the center of an image capturing area 4502 of the image capturing unit 2002 is obtained as a point E (FIG. 11), the center of an image capturing area 4503 of the image capturing unit 2003 is obtained as a point F, the center of an image capturing area 4504 of the image capturing unit 2004 is obtained as a point G, and the center of an image capturing area 4505 of the image capturing unit 2005 is obtained as a point H.

Figure 11:
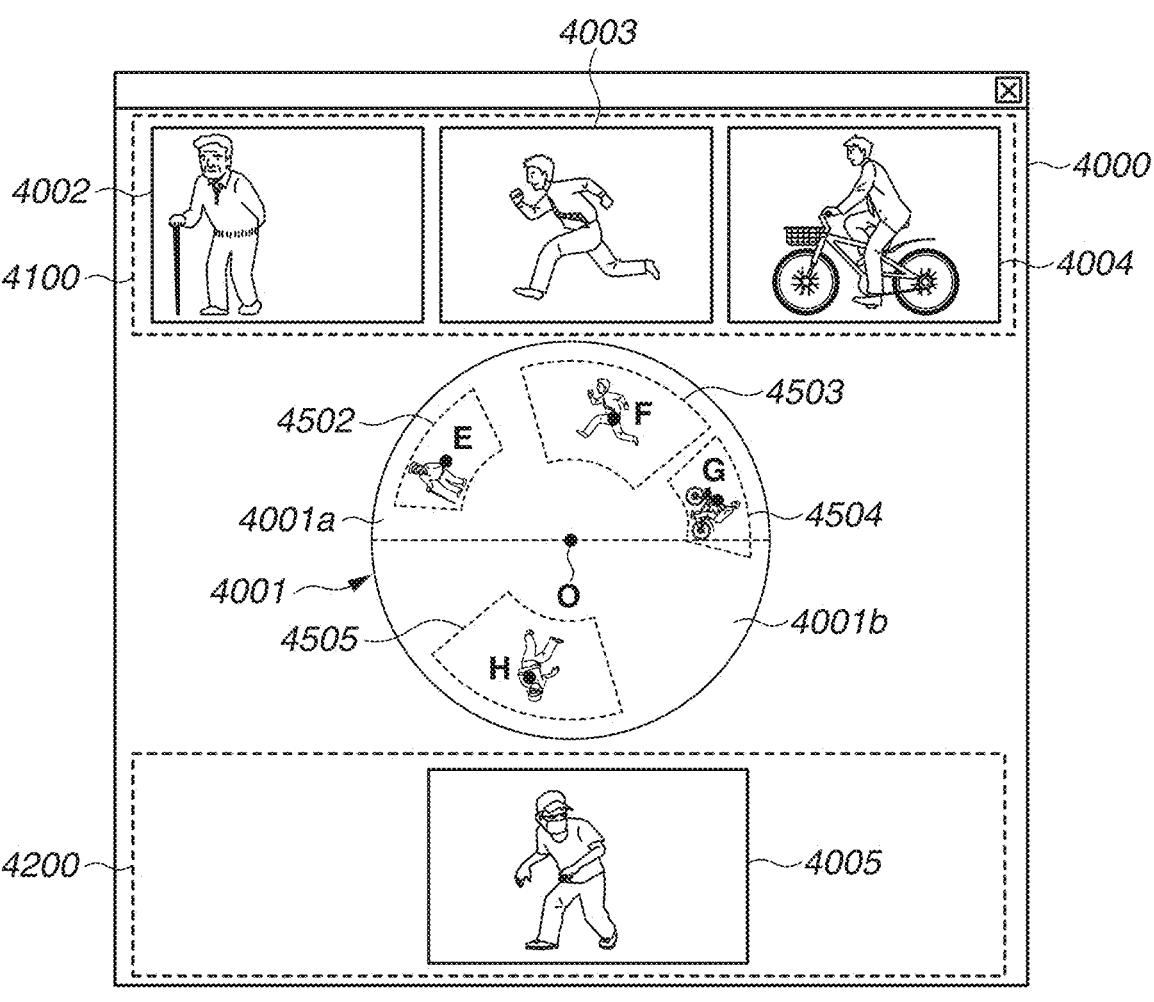
FIG. 11 illustrates a display example of a screen of the GUI according to the second exemplary embodiment.

In step S201, display positions of the images captured by the image capturing units 2002 to 2005 in display areas 4100 and 4200 (FIG. 11) on a screen 4000 (FIG. 11) of the display unit (GUI) 1607 of the terminal apparatus 1600 are determined. The display positions are determined based on the image capturing areas of the image capturing units 2002 to 2005. FIG. 11 illustrates the screen 4000 of the display unit 1607. A circular area 4001 is set at the center of the screen 4000. The image captured by the image capturing unit 2001 is displayed in the area 4001. The rectangular display area 4100 is set above the area 4001, and the rectangular display area 4200 is set below the area 4001. The display areas 4100 and 4200 are each indicated by a broken line.

In the second exemplary embodiment, the area 4001 is divided into two areas, which are upper and lower areas (semicircular areas 4001a and 4001b). If the center of each of the images captured by the image capturing units 2002 to 2005 is located in the area 4001a, the captured image is displayed in the display area 4100. If the center of each of the images captured by the image capturing units 2002 to 2005 is located in the area 4001b, the captured image is displayed in the display area 4200. If a plurality of images is displayed in each of the display area 4100 and the display area 4200, scaling is performed on each of the images, and images after the scaling are displayed in the same size and being arranged at regular intervals. The display positions are determined while the positional relationship between the images in the horizontal direction (i.e., which one of the images is displayed on the left side or the right side of another image) is maintained. Assume that, for example, as illustrated in FIG. 11, the points E, F, and G are located in the area 4001a, and the point H is located in the area 4001b. In this case, the CPU 1601 determines that an image 4002 captured by the image capturing unit 2002, an image 4003 captured by the image capturing unit 2003, and an image 4004 captured by the image capturing unit 2004 are displayed in the same size and at regular intervals at display positions (the images 4002, 4003, and 4003 are arranged in this order from the left side) illustrated in FIG. 11 in the display area 4100. The CPU 1601 determines that an image 4005 captured by the image capturing unit 2005 is displayed in the display area 4200.

In the second exemplary embodiment, the display areas 4100 and 4200 in which two or more of the images 4002 to 4005 can be displayed are set on the screen 4000 of the display unit 1607. In a case where two or more images are displayed in each of the display areas 4100 and 4200, the CPU 1601 displays the two or more images in the same size and at regular intervals. In a case where one image is displayed in each of the display areas 4100 and 4200, the CPU 1601 displays the one image at the center of the corresponding display area.

In step S202, the CPU 1601 displays the images captured by the image capturing units 2002 to 2005 on the screen 4000 based on the display positions determined in step S201. Specifically, the images 4002, 4003, and 4004 are displayed in the same size and at regular intervals from the left side of the display area 4100. The image 4005 is displayed at the center of the display area 4200.

Next, processing of step S203 will be described. The image captured by the image capturing unit 2001 and displayed on the screen 4000 can be displayed in a rotated manner at any angle about a point O illustrated in FIG. 11, as in the first exemplary embodiment. In the second exemplary embodiment, assume that the user designates objects in the images 4004 and 4005 from the image (FIG. 11) captured by the image capturing unit 2001, and the images 4004 and 4005 are displayed in the display area 4200 in response to the designation. To display the images 4004 and 4005 in the display area 4200, the area 4001 is to be rotated on the screen 4000. The CPU 1601 determines an angle φ by which the area 4001 is to be rotated on the screen 4000. In the following description, assume that an instruction to rotate the image captured by the image capturing unit 2001 clockwise by the angle $\varphi$ when the user designates the objects in the images 4004 and 4005 is input via the input unit 1606.

In step S203, the CPU 1601 determines whether an instruction to rotate the image captured by the image capturing unit 2001 is input in response to the designation of the object from the user.

If the CPU 1601 determines that the image rotation instruction is input (YES in step S203), the processing proceeds to step S204. In step S204, the CPU 1601 analyzes the instruction (input signal), rotates the image captured by the image capturing unit 2001 by the angle $\varphi$, and displays the rotated image in the area 4001 of the screen 4000. After the image captured by the image capturing unit 2001 is rotated, the processing proceeds to step S205.

If the image rotation instruction from the user is not detected (NO in step S203), the processing returns to step S202.

In the following description, assume that the instruction to rotate the image captured by the image capturing unit 2001 clockwise by the angle $\varphi$ is input from the user.

Figure 12A:
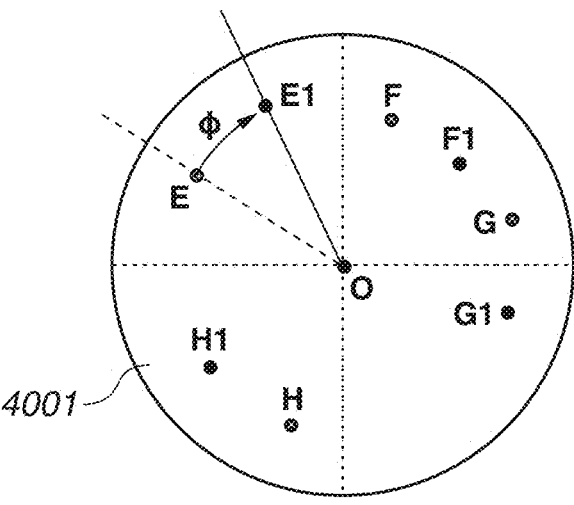
FIGS. 12A and 12B each illustrate the screen of the GUI when images are rotated from a state illustrated in FIG. 11.

In step S205, the CPU 1601 changes (determines) the display positions of the images captured by the image capturing units 2002 to 2005 on the screen 4000 based on the rotation angle $\varphi$ input by the user. When the image captured by the image capturing unit 2001 is rotated clockwise by the angle $\varphi$, as illustrated in FIG. 12A, the point E is also rotated clockwise by the angle $\varphi$ and moves to a point E1. The point F is also rotated clockwise by the angle $\varphi$ and moves to a point F1. The point G is also rotated clockwise by the angle $\varphi$ and moves to a point G1. The point H is also rotated clockwise by the angle $\varphi$ and moves to a point H1. After the rotation, the points E1 and F1 are located in the area 4001a, and thus the CPU 1601 determines that the image 4002 captured by the image capturing unit 2002 and the image 4003 captured by the image capturing unit 2003 are displayed in the same size and at regular intervals in the display area 4100. Meanwhile, the points G1 and H1 are located in the area 4001b, and thus the CPU 1601 determines that the image 4004 captured by the image capturing unit 2004 and the image 4005 captured by the image capturing unit 2005 are displayed in the same size and at regular intervals in the display area 4200.

Figure 12B:
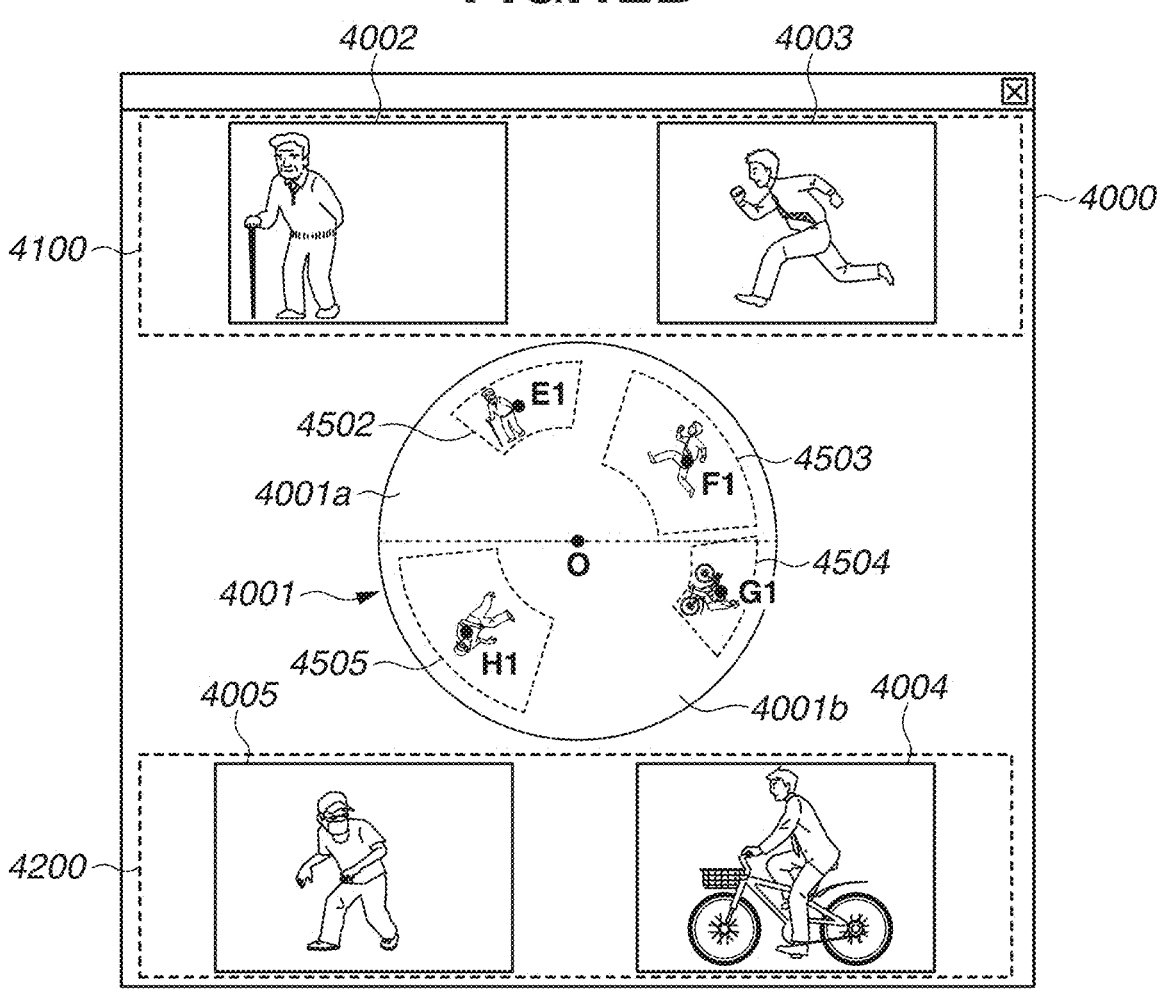

In step S206, as illustrated in FIG. 12B, the CPU 1601 displays the images at the display positions determined in step S205 on the screen 4000. Specifically, the CPU 1601 displays the image 4002 captured by the image capturing unit 2002 and the image 4003 captured by the image capturing unit 2003 in the same size and at regular intervals in the display area 4100, and displays the image 4004 captured by the image capturing unit 2004 and the image 4005 captured by the image capturing unit 2005 in the same size and at regular intervals in the display area 4200. After the processing is performed as described above, the processing flow ends.

With the image capturing apparatus 2000 according to the second exemplary embodiment, the image capturing apparatus 2000 including a combination of the multiple cameras 2002 to 2005 and the wide-angle camera (image capturing unit) 2001 is configured to display the images captured by the multiple cameras 2002 to 2005 by changing the display positions thereof based on a change in display of the wide-angle camera 2001. If the images captured by the multiple cameras 2002 to 2005 are not changed when the image captured by the wide-angle camera 2001 is rotated, it is difficult to understand a correspondence relationship between the image captured by the wide-angle camera 2001 and the images captured by the multiple cameras 2002 to 2005. In the second exemplary embodiment, the correspondence relationship between the images can be easily understood since the positions of the images captured by the multiple cameras 2002 to 2005 are changed in accordance with the rotation of the image captured by the wide-angle camera 2001.

The layout and display positions of the images on the screen 3000 and the screen 4000 described in the first and second exemplary embodiments are merely examples. Any display apparatus may be used as long as the display apparatus can change display of images based on a change in a display position of an image captured by another image capturing unit relative to an image captured by a wide-angle image capturing unit. The image capturing units 2002 to 2005 need not necessarily include the zoom function, and the image capturing direction may be changed only in a pan direction (or only in a tilt direction).

While exemplary embodiments of the present disclosure are described above, the present disclosure is not limited to the above-described exemplary embodiments. Various modifications and changes may be made within the gist of the present disclosure.

The above-described exemplary embodiments are merely embodied examples for carrying out the present disclosure. The technical scope of the present disclosure should not be interpreted in a limited way due to the above-described exemplary embodiments. In other words, the present disclosure can be carried out in various ways without departing from the technical idea and the main features of the present disclosure.

The present disclosure can also be realized by supplying a program for implementing one or more functions according to the above-described exemplary embodiments to a system or an apparatus via a network or a storage medium, and by one or more processors in a computer of the system or the apparatus reading and executing the program. The present disclosure can also be implemented by a circuit (e.g., ASIC) for implementing one or more functions according to the above-described exemplary embodiments.

The above-described exemplary embodiments are merely embodied examples for carrying out the present disclosure. The technical scope of the present disclosure should not be interpreted in a limited way due to the above-described exemplary embodiments. In other words, the present disclosure can be carried out in various forms without departing from the technical idea and the main features of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-125511, filed Aug. 1, 2023, which is hereby incorporated by reference herein in its entirety.

What is claimed is:

1. An information processing apparatus comprising:
at least one processing circuit; and
at least one memory that stores a computer-readable instruction for causing, when executed by the at least one processing circuit, the information processing apparatus to:
obtain a first image from a first image capturing unit that captures a first image with a predetermined angle of view;
obtain a second image from a second image capturing unit that captures a second image which overlaps an area of the first image captured by the first image capturing unit, wherein the second image is captured at an angle of view narrower than the predetermined angle of view; and
perform control to display the first image and the second image on a display screen of display unit such that the obtained first image is displayed in a first region on the display screen and the obtained second image is displayed in a second different region,
wherein, in response to a determination that a user input an instruction to rotate the first image by a predetermined angle on the display unit, control is performed to rotate the first image on the display and cause a display position of the second image on the screen to change, based on the predetermined angle, from the second region to a third region, different from the first and second regions.

2. The information processing apparatus according to claim 1, wherein the obtained first image is captured by the first image capturing unit including a super-wide-angle lens that captures the first image as a 360-degree image.

3. The information processing apparatus according to claim 1, wherein the obtained second image is captured by the second image capturing unit which captures images in a range narrower than a range whose image is captured by the first image capturing unit.

4. The information processing apparatus according to claim 1,
wherein the obtained first image and second image are captured by an imaging unit that includes the first image capturing unit and a plurality of second image capturing units disposed around the first image capturing unit, wherein each of the plurality of second image capturing units captures respective second images and each respective second image is an image which overlaps different areas of the first image captured by the first image capturing unit, and
wherein each respective second image includes areas do not overlap with each other.

5. The information processing apparatus according to claim 4, wherein execution of the stored instructions further causes the information processing apparatus to
perform control to display each of the respective obtained second images in respective second regions positioned around the first region that displays first image, wherein the first region is positioned at a center of the screen of the display unit.

6. The information processing apparatus according to claim 5, wherein a display position of each of the plurality of second images in respective second regions on the screen of the display unit is determined based on an overlap position where the area of the respective obtained second image overlaps the area of the obtained first image.

7. The information processing apparatus according to claim 6, wherein execution of the stored instructions further causes the information processing apparatus to
determine a central position in each of the respective obtained second images and determine which respective second region on the screen that the respective obtained second image is to be displayed based on the determined central position.

8. The information processing apparatus according to claim 7, wherein each of the plurality of obtained second images are captured by instructing each of the second image capturing units to change an image capturing direction in at least one of a pan direction and a tilt direction.

9. The information processing apparatus according to claim 8,
wherein an image capturing angle of each of the plurality of second image capturing units is obtained, and
wherein a central position of the area whose image is captured by each of the plurality of second image capturing units is determined based on the obtained image capturing angle.

10. The information processing apparatus according to claim 5, wherein execution of the stored instructions further causes the information processing apparatus to
set, on the screen of the display unit, a number of second regions to each display respective ones of the
plurality of second images individually, and
wherein, in a case where the first image is rotated by a predetermined angle on the screen of the display unit, a display area in which each of the plurality of second images is to be displayed is determined based on the predetermined angle.

11. The information processing apparatus according to claim 5,
wherein the plurality of second regions are displayed such that the two or more second images are in a same size and arranged at regular intervals.

12. The information processing apparatus according to claim 1, wherein, in a case where an object is designated in the first image, an angle by which the first image is to be rotated is determined based on designation of the object, and the determined angle is the predetermined angle.

13. A method comprising:
obtaining a first image from a first image capturing unit that captures a first image with a predetermined angle of view;

obtaining a second image from a second image capturing unit that captures a second image which overlaps an area of the first image captured by the first image capturing unit, wherein the second image is captured at an angle of view narrower than the predetermined angle of view;

displaying the first image and the second image on a display screen of a display unit such that the obtained first image is displaying in a first region on the display screen and the obtained second image is displayed in a second different region; and in response to a determination that a user input an instruction to rotate the first image by predetermined angle on the display unit, performing control to rotate the first image on the display and cause a display position of the second image on the screen to change, based on the predetermined angle, from the second region to a third region different from the first and second regions.

14. A non-transitory computer-readable storage medium storing a program configured to cause a computer to execute a method, the method comprising:

obtaining a first image from a first image capturing unit that captures a first image with a predetermined angle of view;

obtaining a second image from a second image capturing unit that captures a second image which overlaps an area of the first image captured by the first image capturing unit, wherein the second image is captured at an angle of view narrower than the predetermined angle of view;

displaying the first image and the second image on a display screen of a display unit such that the obtained first image is displaying in a first region on the display screen and the obtained second image is displayed in a second different region; and in response to a determination that a user input an instruction to rotate the first image by predetermined angle on the display unit, performing control to rotate the first image on the display and cause a display position of the second image on the screen to change, based on the predetermined angle, from the second region to a third region different from the first and second regions.

\* \* \* \* \*